US007549500B2

(12) United States Patent
Graham et al.

(10) Patent No.: US 7,549,500 B2
(45) Date of Patent: Jun. 23, 2009

(54) APPARATUS FOR CONTROL OF A MOBILE MACHINE

(75) Inventors: Curt Graham, Lynnville, IA (US); Peter Shkiryak, Knoxville, IA (US); Matthew Hutchinson, Pella, IA (US)

(73) Assignee: Vermeer Manufacturing Company, Pella, IA (US)

( * ) Notice: Subject to any disclaimer, the term of this patent is extended or adjusted under 35 U.S.C. 154(b) by 432 days.

(21) Appl. No.: 11/222,558

(22) Filed: Sep. 8, 2005

(65) Prior Publication Data

US 2007/0062075 A1 Mar. 22, 2007

(51) Int. Cl.
*B60K 26/00* (2006.01)
*G05G 9/053* (2006.01)
*G05G 13/00* (2006.01)

(52) U.S. Cl. ...................................... 180/321; 180/333

(58) Field of Classification Search ............ 74/471 XY, 74/484 R, 523, 551.1, 551.9, 557, 558; 180/315, 180/321, 322, 324, 333; 187/222, 223, 231; 280/1.5, 32.5, 43.12, 47.11, 751
See application file for complete search history.

(56) References Cited

U.S. PATENT DOCUMENTS 3,022,850 A * 2/1962 Bidwell et al. .............. 180/333
3,394,611 A * 7/1968 Beurrier .................... 74/471 R
3,760,648 A * 9/1973 Hoffman ..................... 74/489
4,541,497 A * 9/1985 Riediger et al. ............ 180/6.48
5,257,673 A * 11/1993 Sato et al. .................... 180/271
5,595,259 A * 1/1997 Gilliland et al. ............. 180/332
5,700,050 A * 12/1997 Gonas ................... 296/187.05
5,830,313 A * 11/1998 Smith ......................... 156/584
5,938,282 A * 8/1999 Epple ...................... 297/217.3
6,070,690 A * 6/2000 Eavenson et al. ........... 180/315
6,128,971 A * 10/2000 Papasideris ............ 74/471 XY
6,460,640 B1 10/2002 Keagle et al.
6,601,386 B1 8/2003 Hori et al.
6,694,236 B2 * 2/2004 Onodera ...................... 701/36
6,948,739 B2 * 9/2005 Gallagher et al. ........... 280/770
7,134,515 B2 * 11/2006 Lenkman ..................... 180/11
2004/0251073 A1 * 12/2004 Gerbier et al. .............. 180/333
2005/0011696 A1 1/2005 Bares et al.
2005/0016782 A1 * 1/2005 Gallagher et al. ........ 180/89.12
2005/0098375 A1 * 5/2005 David et al. ................. 180/333
2006/0102392 A1 * 5/2006 Johnson et al. ............ 180/19.1

FOREIGN PATENT DOCUMENTS

DE 3722544 A1 * 1/1989
WO WO 2005/079468 A2 9/2005

* cited by examiner

*Primary Examiner*—Faye M. Fleming
*Assistant Examiner*—Laura Freedman
(74) *Attorney, Agent, or Firm*—Merchant & Gould P.C.

(57) ABSTRACT

A control system for use with a mobile machine. The control system including a hand-grip bar having right and left curved sections. The curved sections each define an approximate center. The control system further including joysticks positioned at the approximate center of the curved sections. The curved sections each have a radius such that an operator can operate one or both joysticks without releasing his grip from the hand-grip bar.

16 Claims, 10 Drawing Sheets

APPARATUS FOR CONTROL OF A MOBILE MACHINE

TECHNICAL FIELD

This disclosure generally relates to control systems for hydraulics on mobile machines. More particularly, this disclosure relates to an operator station arrangement having a joystick type device for controlling one or more functions of a mobile machine.

BACKGROUND

Various machines include hydraulic systems with motors and other hydraulic components, including cylinders, configured to be activated by an operator using various forms of operator controls. One form of control is known as a joystick, which often controls at least two separate functions with a single control lever. For instance, one function is typically controlled by fore-aft movement of the control lever, while another function is controlled by lateral movement. One example of separate functions controlled by a single joystick involves a loader mechanism having a lift cylinder and a bucket cylinder. The lift cylinder raises and lowers a bucket and the bucket cylinder rotates the bucket around a pivot axis for dumping. The bucket is operated by controlling the direction of flow and the rate of flow of hydraulic fluids to the lift and bucket cylinders. A common control system arrangement utilizes fore-aft movement of the joystick to control the lift cylinder, and lateral movement to control the bucket cylinder. If the joystick is pushed forward, away from the operator, the lift cylinder lowers the bucket; when pulled toward the operator, the lift cylinder raises the bucket. If the joystick is pushed to the right, the bucket cylinder rotates the bucket to dump material; when pulled to the left, the bucket cylinder rotates the bucket to load material or retain material within the bucket.

Typically, the flow rate and resulting speed of the associated functions are related to the travel of the joystick. As the joystick moves further from a centered position, the flow rate increases and the speed of the function increases. Operation of machines having this type of operator control requires the operator to move the joystick in a proper direction, and to move the joystick a proper distance.

Often, when operating a mobile machine, the operator is subjected to the movement of the machine. On rough terrain or surfaces, it can be difficult to control the position of the joystick. This problem is pronounced with some machines, such as compact skid steer loaders or compact tool carriers. In operating these machines, the operator either walks along with the machine, or stands on the back of the machine, while operating the controls. An example of a prior art control system for the type of machine where the operator walks along with the machine is disclosed in U.S. Pat. No. 6,460,640 to Keagle et al. In either case, it can be difficult to precisely control the machine while riding or walking over rough terrain, and while performing multiple machine operations. In general, an improved control arrangement is needed.

SUMMARY

The present disclosure concerns a control system for a machine. The control system includes to a hand-grip bar having a curved section that wraps around a lever. The lever is a joy-stick type lever moveable from a centered position to at least fore and aft positions and first and second lateral positions. The control system provides a machine operator stabilization while at the same time permitting the operator to control the machine. For example, the lever and the hand-grip bar are arranged so that the operator can move the lever to and between any of the fore, aft, and lateral positions without releasing his grip from the hand-grip bar. The control system can be used on a number of machines, such as a track loader or wheeled loader, for example.

A variety of examples of desirable product features or methods are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are explanatory only, and are not restrictive of the claimed invention.

Figure 1:
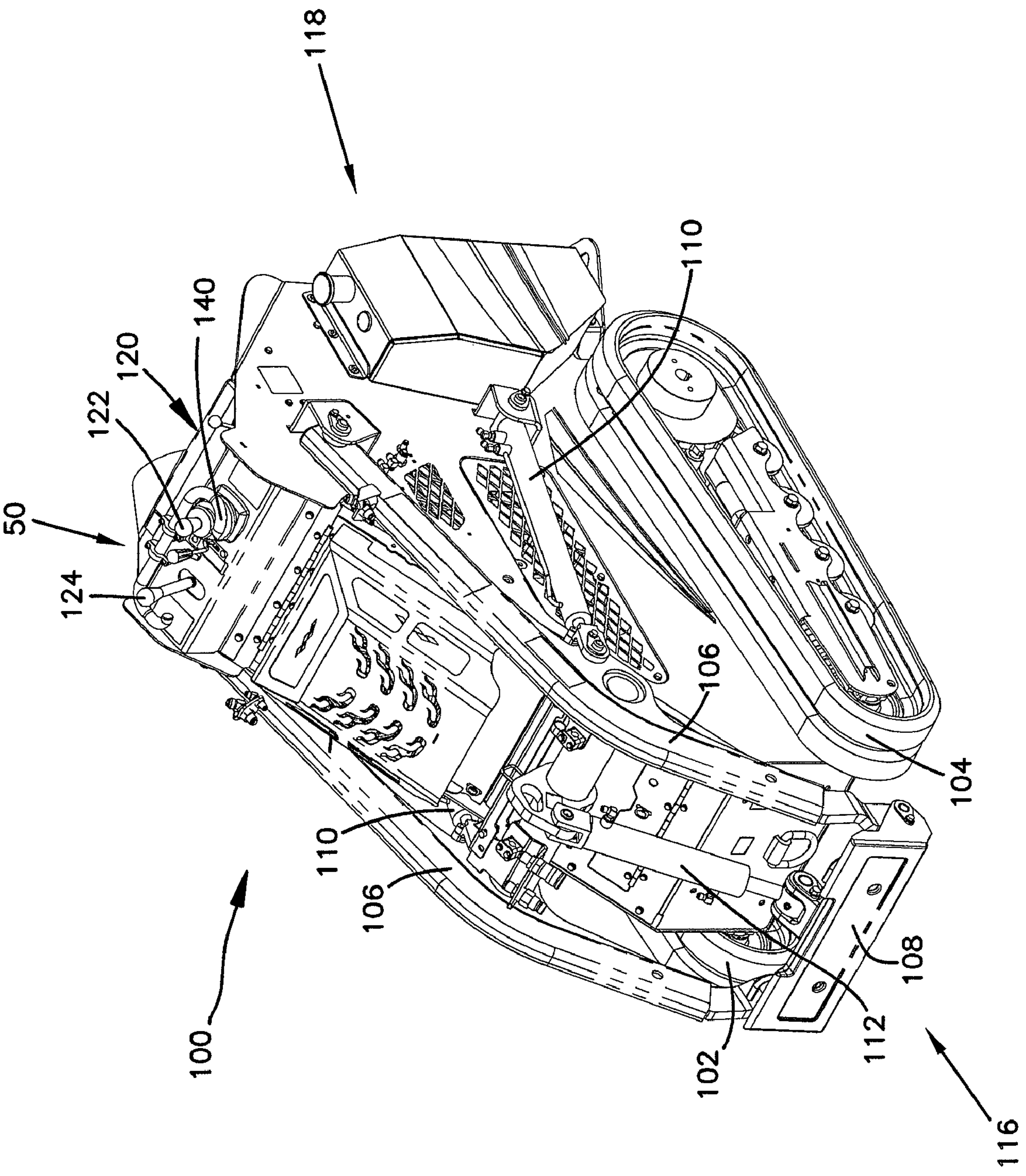
FIG. 1 is an isometric view of one embodiment of a machine having a control arrangement in accordance with the principles disclosed.
Figure 3:
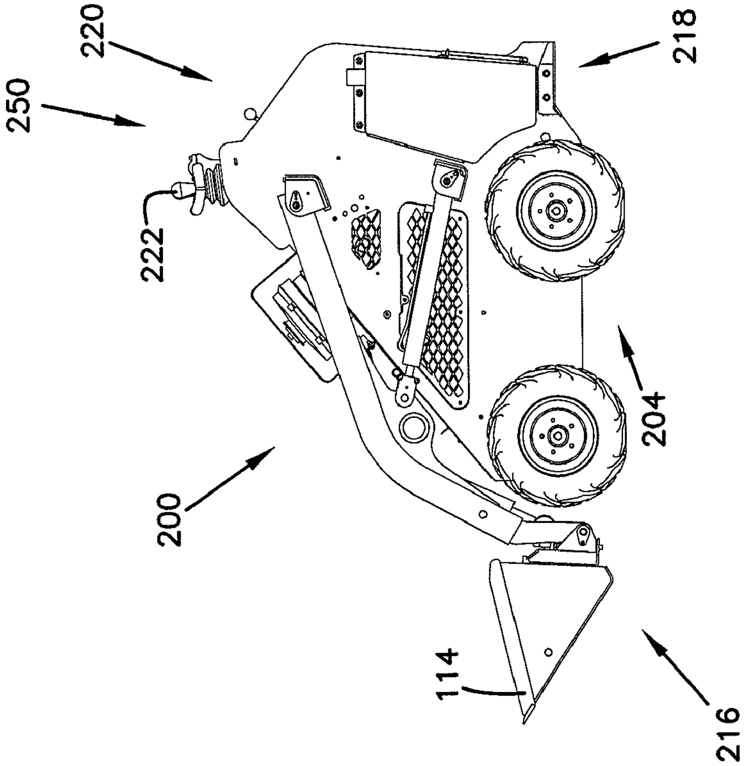
FIG. 3 is a side elevation view of another embodiment of a machine having a control arrangement in accordance with the principles disclosed.
Figure 6A:
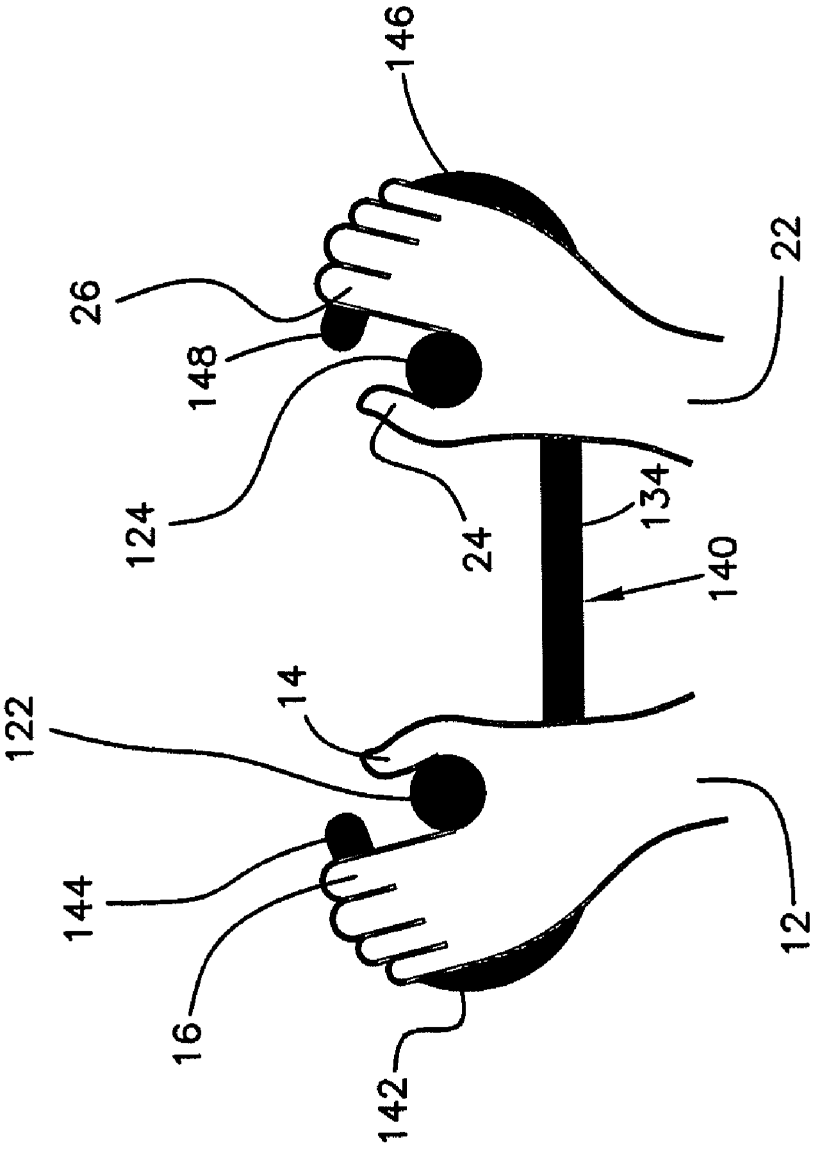

FIG. **6*a* is a schematic representation of an operator station of the control arrangement of FIGS. 1 and 3**;

FIG. **6*b* is a top plan view of a hand-grip bar of the operator station of FIG. 6*a*;**

Figure 6C:
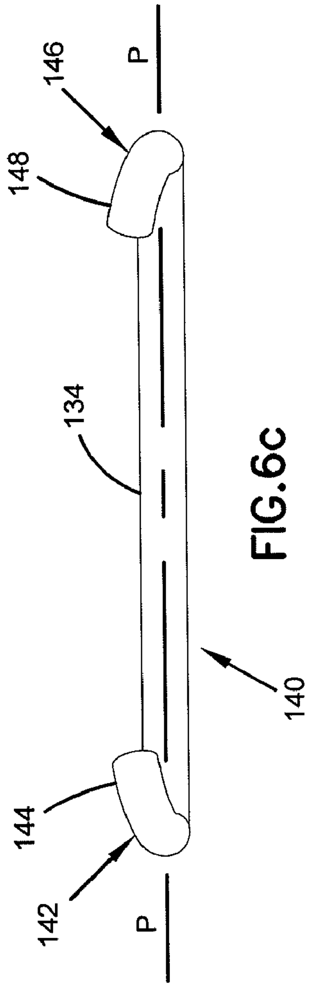
Figure 6B:
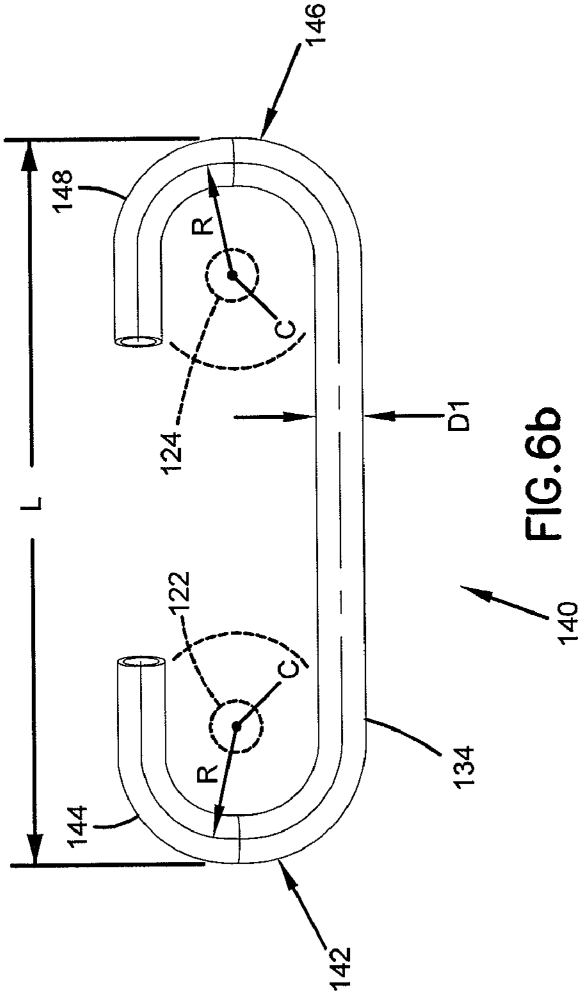

FIG. **6*c* is a front elevation view of the hand-grip bar of FIG. 6*b*;**

FIGS. **7*a* to 7*e* are graphical representations of the basic positions of a ground drive control lever of the operator station of FIG. 6*a*;**

Figure 9:
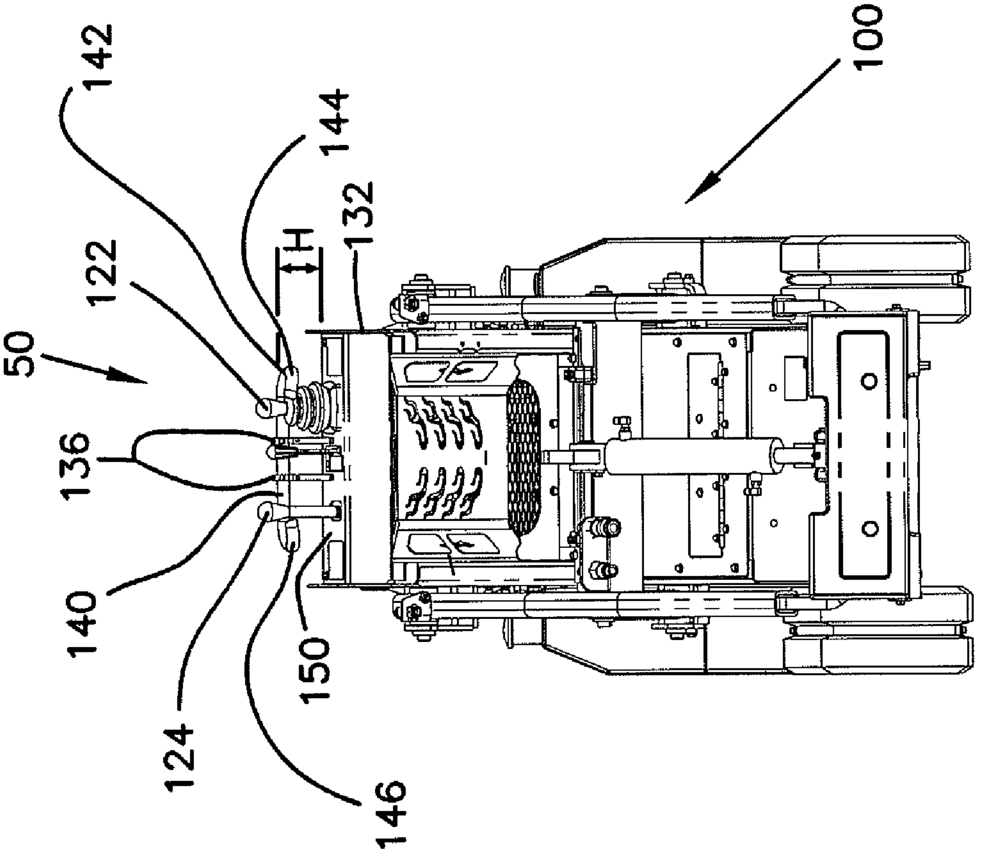

FIG. **8*a* is a hydraulic schematic of a ground drive circuit of the control arrangement of FIGS. 1 and 3**;

FIG. **8*b* is a hydraulic schematic of lift and roll circuits of the control arrangement of FIGS. 1 and 3; and FIG. 9 is a front elevation view of the machine of FIG. 1**.

DETAILED DESCRIPTION

Reference will now be made in detail to various features of the present invention illustrated in the accompanying drawings. Wherever possible, the same reference numbers will be used throughout the drawings to refer to the same or like parts.

Referring to the drawings, FIG. 1 illustrates a machine 100 having a frame 132. The frame 132 of the machine 100 supports a control system 50 constructed in accordance with the principles of the present disclosure. The machine 100 includes lift arms 106 and a mounting plate 108. The mounting plate 108 is located at a front 116 of the machine 100. The control system 50 includes an operator station 120 located at a rear 118 of the machine 100. The operator station 120 includes a joystick-type device or control lever 124 that controls lift cylinders 110 and a mounting plate tilt cylinder 112.

Still referring to FIG. 1, the machine 100 further includes a right track assembly 102 and a left track assembly 104. The right and left track assemblies 102, 104 are driven or powered by hydraulic motors (not shown). The right and left track assemblies 102, 104 travel in either a forward direction or a rearward direction, and at varying speeds. The operator station 120 includes another joystick or ground drive lever 122 to control the direction of rotation and speed of rotation of the right and left track assemblies 102, 104.

In operation, the operator controls lift and roll (or tilt) functions, e.g., lift and roll of the mounting plate 108, by use the control lever 124 located at the operator's right hand. Often, at the same time, the operator also controls the drive to the track assemblies 102, 104, including speed of travel and direction of travel, by use of the ground drive lever 122 located at the operator's left hand.

Figure 2:
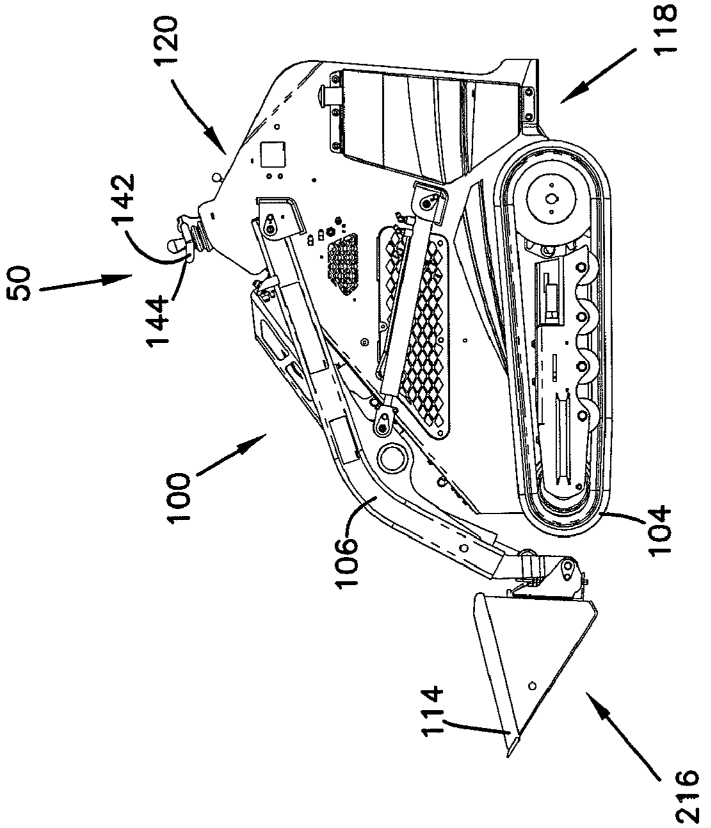
FIG. 2 is a side elevation view of the machine illustrated in FIG. 1.

FIG. 2 illustrates the machine 100 with a bucket 114 mounted to the mounting plate 108. The bucket 114 is often used to load material at one point, and transport that material to a second point where it is unloaded. The ability to operate the lift and roll functions while at the same time operating the ground drive is advantageous, allowing the operator to utilize the bucket 114 efficiently.

FIG. 3 illustrates another machine 200 having a control system 250 in accordance with the principles disclosed. The machine 200 includes a bucket 214 located at a front 216 of the machine 200, and an operator station 220 located at a rear 218 of the machine. This embodiment uses a pair of wheels 204 on the left side, and a pair of wheels on the right side (not shown) for ground engagement. All four wheels are driven and controlled by a ground drive lever 222 that functions to control the speed and direction of rotation of the wheels 204 in the same manner as the ground drive lever 122 controls the tracks of the previous embodiment.

The machine 200 is used in a manner similar to the first machine 100, i.e., the operator often employs simultaneous control of the ground drive and lift and roll functions to maximize productivity. It is to be understood that the control system 250 of the machine 200 illustrated in FIG. 3 functions in the same manner as the first embodiment. While the remainder of the detailed description refers to the first embodiment, the description is also applicable to the alternative embodiment of FIG. 3.

Figure 4:
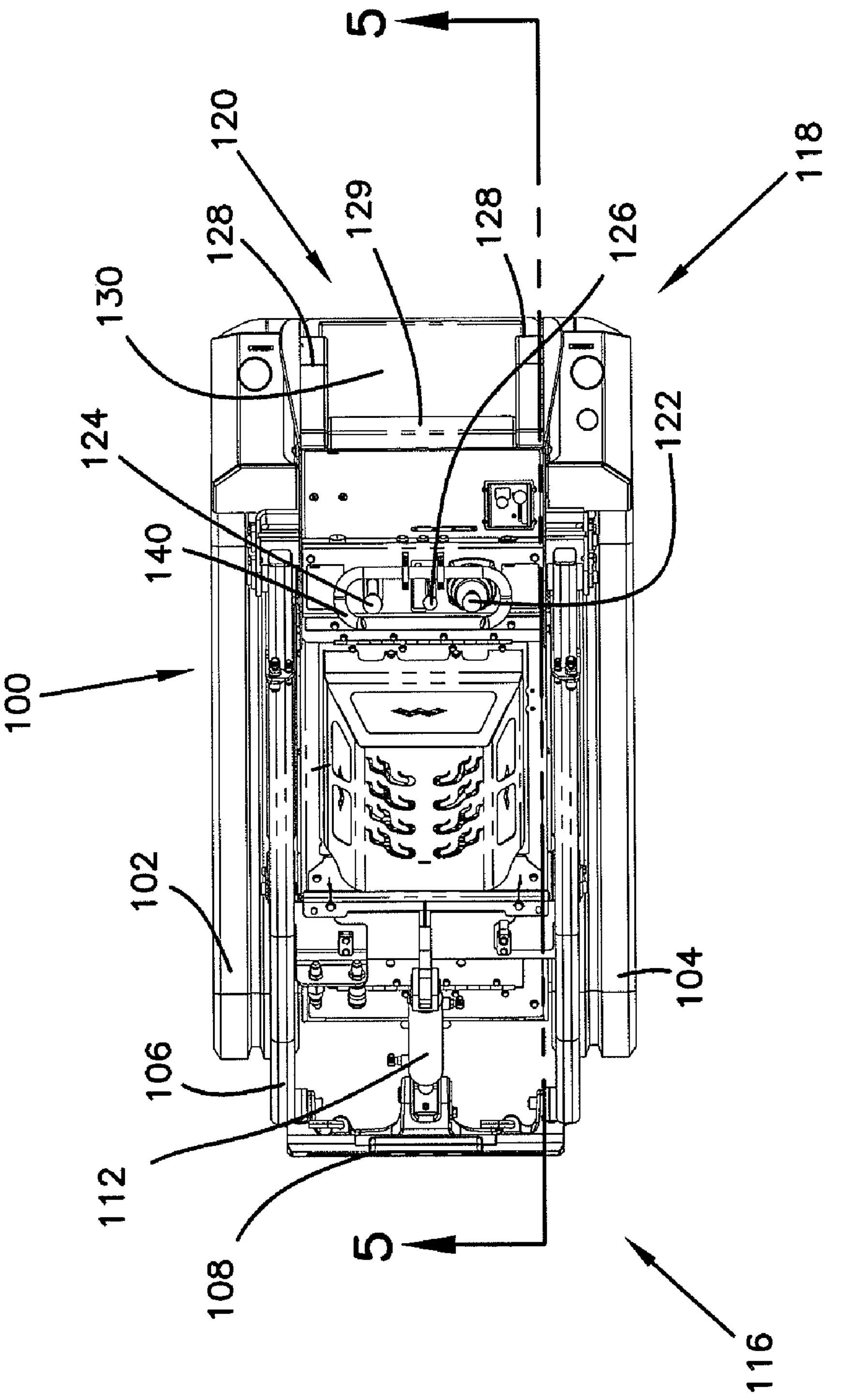
FIG. 4 is a top plan view of the machine of FIG. 1.

Referring now to FIG. 4, a top view of the machine 100 of FIG. 1 is illustrated. The mounting plate 108 of the machine 100 is pivotally mounted to the arms 106 and oriented by the tilt cylinder 112. The control lever 124, which controls hydraulic flow to both the tilt cylinder 112 and the lift cylinders 110, is located on the right side of the operator station 120 at the rear 118 of the machine 100. The ground drive lever 122, which controls direction and speed of both of the right track 102 and the left track 104, is located on the left side of the operator station 120. An auxiliary circuit control lever 126 is located between the control lever 124 and the ground drive lever 122. The auxiliary circuit control lever 126 is used to control an auxiliary circuit (not shown).

Figure 5:
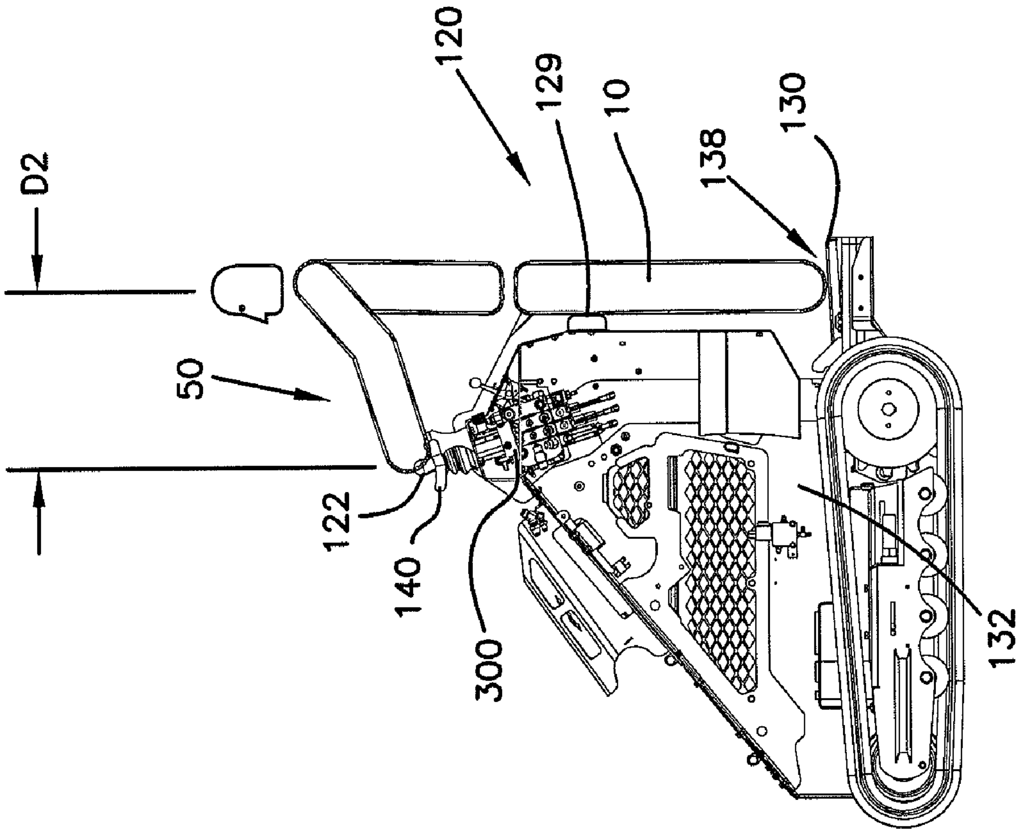
FIG. 5 is a side elevation view of the machine of FIG. 2, shown with a partial cut-away, and shown with an operator standing on a platform of the machine.

As shown in FIG. 5, the ground drive lever 122 of the control system 50 is connected to a pilot controller 300. Further details of an example pilot controller 300 are described in U.S. Pat. No. 6,601,386, the disclosure of which is hereby incorporated by reference. In U.S. Pat. No. 6,601,386, the pilot controller is called an operating lever unit and has several optional functional arrangements. One preferred pilot controller that can be used with the disclosed control system 50 is manufactured by Bondioli & Pavesi, Italy, Model No. HPCJ3U3.

Figure 8A:
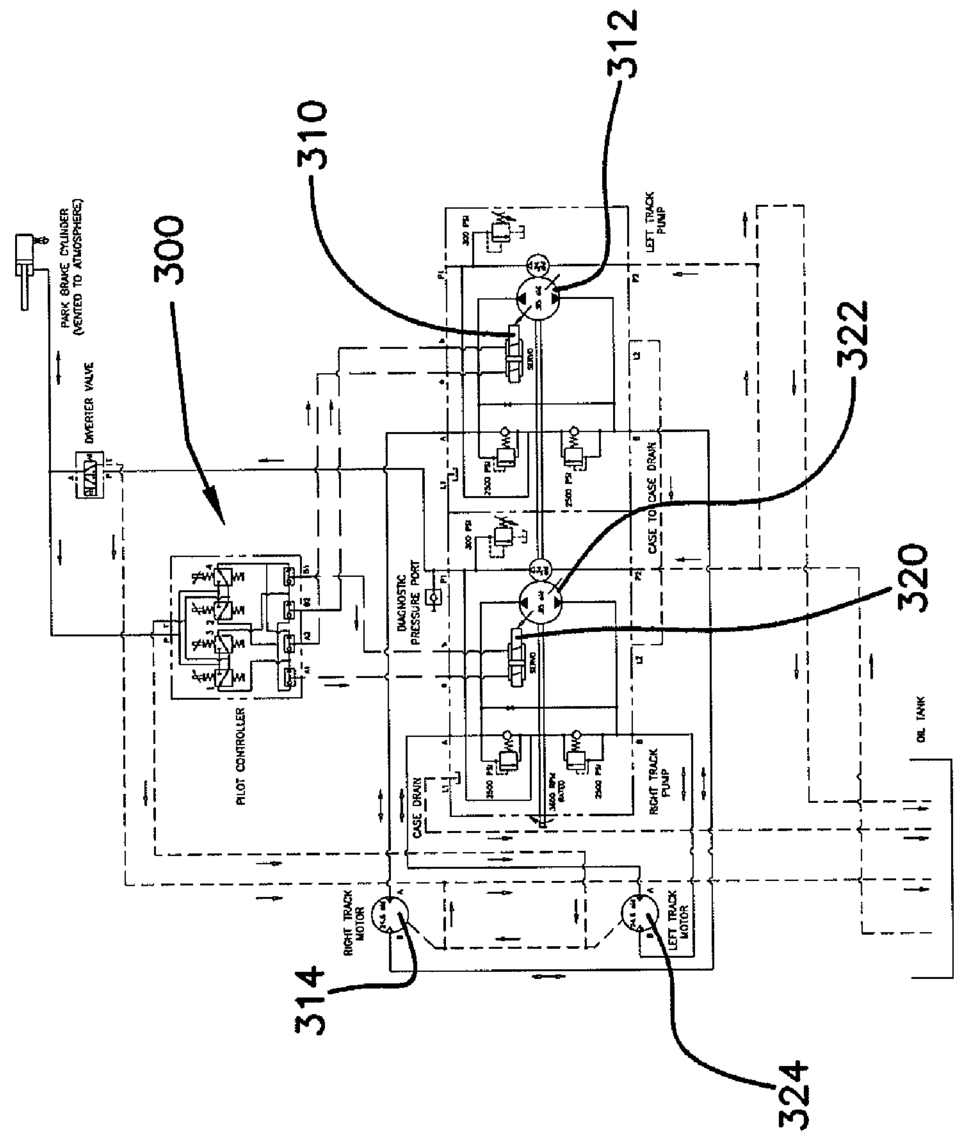

The pilot controller 300 of the control system 50 is schematically illustrated in FIG. 8*a*. The controller 300 is activated by the ground drive lever 122 to provide a hydraulic signal to first and second servos 310, 320. The first servo 310 controls a pressure signal that in turn controls a position of a swash plate. The position of the swash plate determines the direction in which oil is pumped and the rate at which oil is pumped from a first ground drive pump 312 to a right track motor 314. Likewise, the second servo 320 controls a pressure signal to a second ground drive pump 322, which provides oil flow to a left track motor 324. The output of the ground drive pumps 322, 312 is proportional to the flow rate of hydraulic fluid from the pilot controller 300. The pilot controller 300 and the ground drive lever 122 function to control the speed and direction of the track assemblies 102, 104.

Still referring to FIG. 5, an operator 10 is shown standing on a platform 130 at the operator station 120 of the machine 100. During operation, the operator 10 rides on the platform 130 as the machine 100 travels across the terrain. Either embodiment of the machine 100, 200 is capable of traveling over a wide variety of terrains. The platform 130 is mounted to the frame 132 of the machine 100, and thus the operator 10 is subjected to a variety of vibrations and movement as the machine travels along the ground.

Due to the operational vibrations and movements of the machine, a hand-grip bar 140 is provided so that while traveling, the operator 10 can stabilize his body. The operator holds onto the hand-grip bar 140 while standing on the platform 130 during operation of the machine 100. Operation of the machine is intended to include performing one or both of the lift and roll functions and the drive functions.

To dampen contact between the machine and the operator during operation on rough terrain, lateral bumpers or pads 128 (FIG. 4) are provided at the sides of the platform 130, and a front bumper or pad 129 (FIGS. 4 and 5) is provided forward of the platform 130. The bumpers 128, 129 are provided for comfort when traversing rough terrain, and are positioned to aid the operator 10 in stabilizing his body.

As can be understood, at the same time the operator 10 is gripping the hand-grip bar 140 to stabilize his body, he must also use his left hand to position the ground drive lever 122 to control the direction and speed of travel of the machine 100. The operator's right hand may simultaneously be positioning the control lever 124 to control the lift and roll functions of the machine. Thus, each of the right and left hands of the operator is used to both stabilize the operator's body, and operate one or both of the ground drive lever 122 and the control lever 124. The hand-grip bar 140 of the present disclosure permits an operator to operate one or both levers 122, 124 without releasing his grip on the hand-grip bar 140. That is, the hand-grip bar 140 allows the operator to easily hold onto the machine 100 at all times while traversing the terrain, and while operating any or all functions.

The operator station 120 of the present control system 50 is ergonomically designed to allow an operator to comfortably and safely perform all functions. In particular, the hand-grip bar 140 and each of the levers 122, 124 are constructed and arranged so that the operator's hands can remain in contact with the bar while simultaneously operating the control system 50.

For example, referring now to FIGS. 6*a*-6*c*, the hand-grip bar 140 includes a linear central section 134, and first and second curved sections 142, 146 located at each of the ends (left and right ends) of the linear central section 134. The curved sections 142, 146 are configured with a radius R (FIG. 6*b*) sized such the operator 10 can, for instance, grasp the ground drive lever 122 (FIG. 6*a*) with a thumb 14 and a forefinger 16 of his left hand 12 and still maintain a grip on the bar 140 with that same hand. Preferably, the radius of the curved sections 142, 146 ranges from about 1.0 inches to 6.0 inches. In the illustrated embodiment, the radius is about 2.0 inches. Also, preferably, each of the curved sections 142, 146 has an end 144, 148 that slightly bends or curves upward from a plane P (FIG. 6*c*) defined by the central section 134 of the hand-grip bar 140 (see also FIGS. 2 and 5). The upward bend improves the ergonomics of the hand-grip bar 140 for ease use and operation of the control system 50.

In one embodiment, the hand-grip bar 140 is constructed from a round bar or tube stock. The tube stock is preferably a diameter D1 (FIG. 6*b*) that is comfortable for the operator to grasp with his fingers. For example, the hand-grip bar 140 can be constructed from tube stock having a diameter from about 0.75 inches to 1.25 inches, typically about 1.00 inches.

Still referring to FIGS. 6*a*-6*c*, the curved sections 142, 146 of the hand-grip bar 140 wrap around the levers 122, 124 so than an operator can move the levers to any one of a number of operating positions without releasing the hand-grip bar 140. For example, the first curved section 142 of the hand-grip bar 140 is positioned such that an approximate center C (FIG. 6*b*) of the curved section 142 is aligned with the ground drive lever 122 when the ground drive lever 122 is in a centered position (shown schematically in dashed line in FIG. 6*b*).

The combination of the particular placement of the ground drive lever 122 and the configuration of the hand-grip bar 140 is an advantageous feature of the disclosed control system 50. In particular, the combination accommodates ease of use and control of the machine, and permits simultaneously operation of the machine and operator stabilization. Specifically, the combination involves placing the ground drive lever 122 so that the travel or movement of the ground drive lever 122 from the centered position is limited so as to avoid interference with the hand-grip bar 140. The combination also involves sizing the radius of the curved section 142 so as to not obstruct the movement or positioning of the ground drive lever 122 (as described below), but still permit an operator to easily grip the bar for stabilization.

Referring now to FIGS. 7*a*-7*e*, drive operations of the machine 100 are controlled by positioning the ground drive lever 122 in one of a number of positions. For example, when the ground drive lever 122 is moved in a forward direction 122*a* (FIG. 7*a*) both of the ground drive pumps 312, 322 are activated so that the ground drive motors 314, 325 propel the tracks 102, 104 to move the machine 100 forward; as the control lever 122 is moved further forward, the displacement of the pumps 312, 322 is increased, thereby increasing the flow rate. When the flow rate increases, the speed or rotation of the motors 314, 324 increases. Ground drive speed is accordingly proportional to the forward displacement of the ground drive control lever 122. Similarly, when the control lever 122 is moved in a rearward direction to position 122*b* (FIG. 7*b*), the flow is reversed, the direction of rotation of the motors 314, 324 is reversed, and the machine 100 moves in reverse.

If the control lever 122 is moved to the left, to position 122*c* (FIG. 7*c*), the left track assembly 104 is operated to propel the machine 100 in a reverse direction, while the right track assembly 102 is operated to propel the machine in a forward direction. This drive configuration makes the front 116 of the machine 100 move to the left, i.e., the machine 100 spins counterclockwise. The opposite happens when the control lever 122 is moved to the right, to position 122*d* (FIG. 7*d*); in particular, the front 116 of the machine 100 moves to the right (i.e., the machine 100 spins clockwise).

Figure 7A:
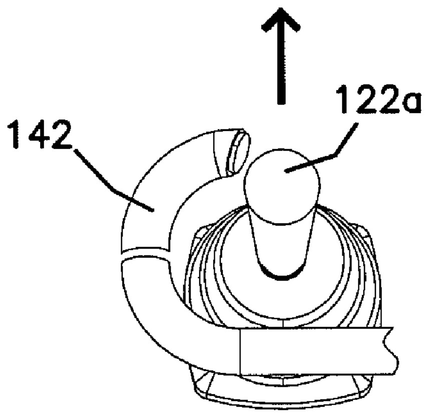
Figure 7B:
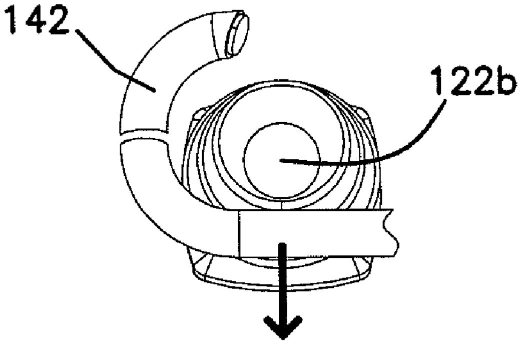
Figure 7C:
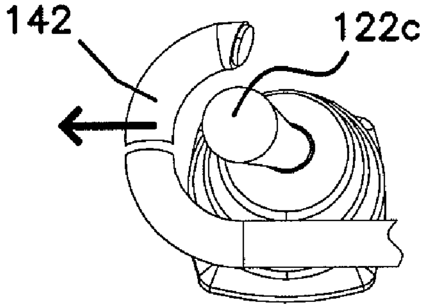
Figure 7D:
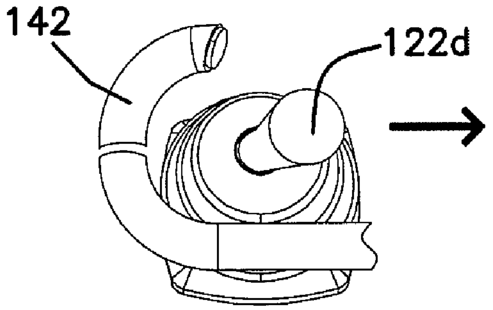
Figure 7E:
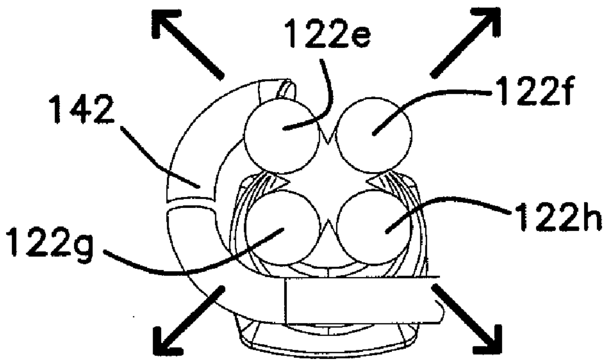

Intermediate positions of the ground drive control lever 122 are illustrated in FIG. 7*e*, including: position 122*e* where the machine 100 will steer to the left while moving forward; position 122*f* where the machine 100 will steer to the right while moving forward; position 122*g* where the front 116 will steer to the left while the machine 100 is moving rearward; and, position 122*h* where the front 116 will steer to the right while the machine 100 is moving rearward. Because of the described construction and arrangement of the ground drive lever 122, the pilot controller 300, and the hand-grip bar 140, the operator is able to both operate the drive lever 122 and stabilize his body with his left hand.

Referring again to FIGS. 6*a*-6*c*, the second curved section 146 of the hand-grip bar 140 is also configured with the above described radius such that the right hand 22 of the operator 10 can operate the control lever 124 with a thumb 24 and a forefinger 26, while his fingers grasp the second curved section 146. For example, similar to the first curved section 142, the second curved section 146 of the hand-grip bar 140 is positioned such that an approximate center C (FIG. 6*b*) of the curved section 146 is aligned with the control lever 124 when the control lever 124 is in a centered position (shown schematically in dashed line in FIG. 6*b*). The hand-grip bar 140 and the control lever 124 are also arranged and configured in relation to one another so that no interference occurs during operation of the control lever 124.

Figure 8B:
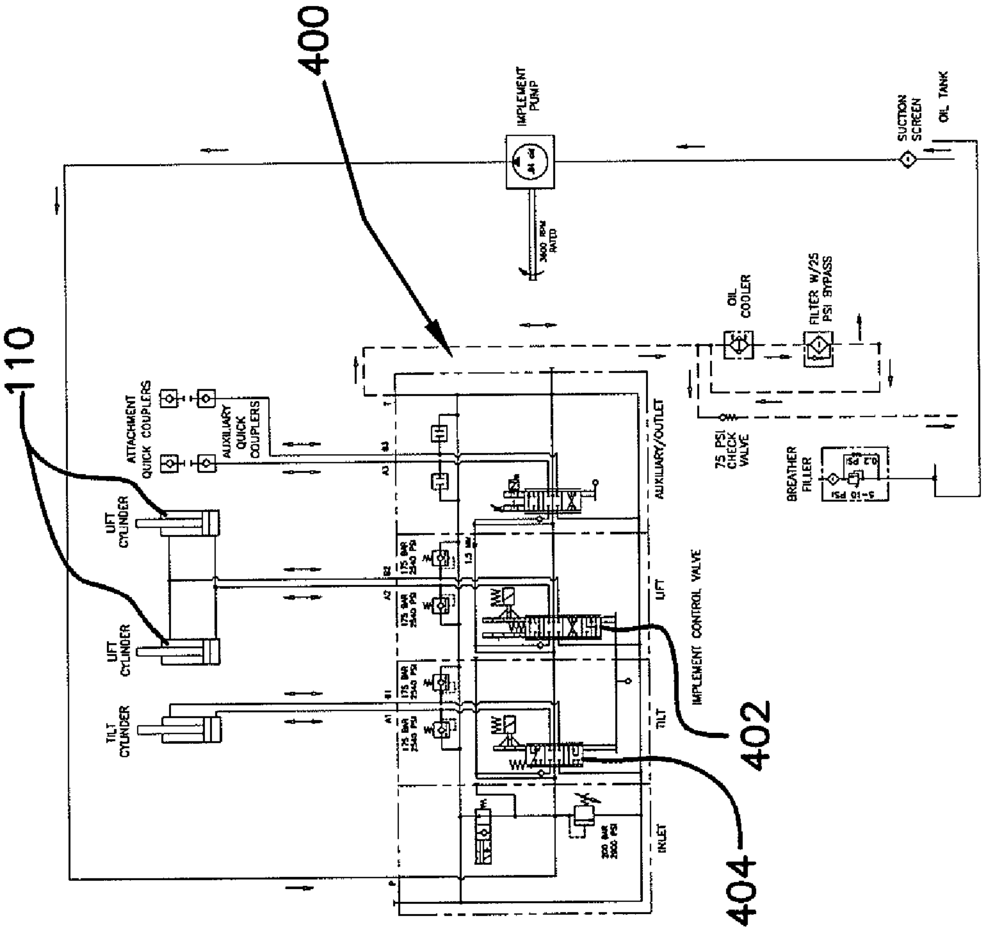

Referring now to FIG. 8*b*, the control lever 124 is connected to an implement control valve 400. The implement control valve 400 is configured with a lift valve 402 that controls the flow of hydraulic fluid to the lift cylinders 110. In operation, fore-aft movement of the control lever 124 raises and lowers the lift arms 106 (FIG. 1) of the machine 100. Lateral or side-to-side movement of the control lever 124 positions a tilt valve 404, which in turn controls the flow of hydraulic oil to the tilt cylinder 112. In the illustrated embodiment, the control lever 124 is directly connected to the lift and tilt valves 402, 404 so that movement of the control lever 124 directly controls flow to the lift and tilt cylinders 110, 112. In an alternative embodiment, a pilot controller can be used in place of the implement control valve 400.

In general, the control system 50 of the machine 100 includes the operator station 120 having the hand-grip bar 140 with the first and second curved sections 142, 146 positioned in relation, as described, to the ground drive control lever 122 and the control lever 124. The disclosed control system 50 allows an operator to operate each of the levers with one hand while simultaneously using the same hand to stabilize his body.

Referring now to FIG. 9, a front view of machine 100 is illustrated. The hand-grip bar 140 of the control system 50 is rigidly connected to the frame 132 of the machine by mounts 136. The mounts 136 are located along the linear central section 134 of the bar so as to not interfere with the movement and positioning of the levers 122, 124. In one embodiment, the hand-grip bar 140 has a hoop length L (FIG. 6*b*) of about 14 to 16 inches, typically about 15 inches. The height H (FIG. 9) of the bar 140 is preferably less than 8 inches, more preferably less than about 6.5 inches above a hand deck 150 of the operator station 120.

Referring again to FIG. 5, the hand-grip bar 140 and the levers 122, 124 of the operator station 120 are located a distance D2 forward of a standing region 138 of the platform 130. The forward placement of the bar 140 and levers 122, 124 requires the operator to lean slightly forward against the front bumper 129. Typically, the operator's legs will rest against the front bumper 129 when standing in the standing region 128. In one embodiment, the distance D2, defined between a center of the levers 122, 124 when in the centered position and the standing region 138, is between 18 and 24 inches; preferably, about 20 to 22 inches. The forwardly placed bar 140 and levers 122, 124 further aids in allowing an operator to stabilize himself in comparison to conventional arrangements.

Various principles of the embodiments included in the present disclosure may be used in other applications. The above specification provides a complete description of the present invention. Since many embodiments of the invention can be made without departing from the spirit and scope of the invention, certain aspects of the invention reside in the claims hereinafter appended.

What is claimed is:

1. A control system for a machine, comprising:

a) a bar having a first curved section and second curved section, each curved section defining an approximate center; and b) a first lever and a second lever, each lever moveable from a centered position to at least fore and aft positions and first and second lateral positions, the first lever being located at the approximate center of the first curved section when positioned at the centered position;

c) wherein the first curved section has a radius such that an operator can position the first lever in any selected one of the fore and aft and first and second lateral positions with his hand without releasing his grip of that hand from the first curved section.

2. The system of claim 1, wherein the first lever is capable of controlling two functions, one of the functions being associated with the fore and aft positions of the first lever, the other of the functions being associated with the first and second lateral positions of the first lever.

3. The system of claim 1, wherein the first curved section has a radius of between about 1.0 inches and 6.0 inches.

4. The system of claim 1, wherein the first curved section has a radius of about 2.0 inches.

5. The system of claim 1, wherein the curved sections each have an end that bends upward from a plane defined by the curved section.

6. The system of claim 1, wherein the second lever is located at the approximate center of the second curved section when positioned at the centered position.

7. The system of claim 1, wherein the first and second curved sections are located at opposite ends of a linear central section.

8. A machine, comprising:

a) a frame; and b) an operator station supported by the frame, the operator station including:

i) a bar having a first curved section and a second curved section, each curved section defining an approximate center; and ii) a first lever and a second lever, each lever moveable from a centered position to at least fore and aft positions and first and second lateral positions, each lever being located at the approximate center of one of the curved sections when positioned at the centered position.

9. The machine of claim 8, further including a platform supported by the frame, the platform being sized and arranged such that an operator rides on the platform in a standing position while operating the first lever of the operator station.

10. The machine of claim 9, further including a bumper located above the platform wherein the operator's legs contact the bumper for stabilization during operation of the machine.

11. The machine of claim 9, wherein the first lever is located a distance forward of a standing region of the platform such that the operator is required to lean forward during operation of the machine.

12. The machine of claim 11, wherein the first lever is between 18 and 24 inches forward of the standing region of the platform.

13. The system of claim 8, wherein the first curved section of the bar has a radius such that an operator can position the first lever in any selected one of the fore and aft and first and second lateral positions with his hand without releasing his grip of that hand from the first curved section.

14. A control system for a machine, comprising:

a) a hand-grip bar having a first and second ends; and b) first and second levers moveable from a centered position to at least fore and aft positions and first and second lateral positions;

c) wherein the first and second ends of the hand-grip bar wrap around the first and second levers, respectively, such than an operator can move the first and second levers to any one of the fore, aft, and lateral positions without releasing the hand-grip bar.

15. The system of claim 14, wherein the first and second ends of the hand-grip bar are defined by curved sections that wrap around the first and second levers.

16. The system of claim 15, wherein the curved sections of the hand-grip bar bend upward from a plane defined by a central section of the hand-grip bar.

* * * * *